(12) United States Patent
Spicer et al.

(10) Patent No.: US 11,053,445 B2
(45) Date of Patent: Jul. 6, 2021

(54) HEAT TRANSFER TUBE FOR HYDROCARBON PROCESSING

(71) Applicant: ExxonMobil Chemical Patents Inc., Baytown, TX (US)

(72) Inventors: David B. Spicer, Houston, TX (US); Bharath Krishnamoorthi, Zachary, LA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 520 days.

(21) Appl. No.: 15/954,249

(22) Filed: Apr. 16, 2018

(65) Prior Publication Data

US 2018/0320088 A1 Nov. 8, 2018

Related U.S. Application Data

(60) Provisional application No. 62/502,249, filed on May 5, 2017.

(51) Int. Cl.
*C10G 9/20* (2006.01)
*C10G 9/16* (2006.01)
*F28F 1/40* (2006.01)
*C10G 75/00* (2006.01)
*B01J 19/00* (2006.01)
*B01J 19/24* (2006.01)

(52) U.S. Cl.
CPC ............. *C10G 9/20* (2013.01); *B01J 19/006* (2013.01); *B01J 19/2415* (2013.01); *C10G 9/16* (2013.01); *C10G 75/00* (2013.01); *F28F 1/40* (2013.01)

(58) Field of Classification Search
CPC .. C10G 9/20; C10G 75/00; C10G 9/16; F28F 1/40; B01J 19/006; B01J 19/2415
See application file for complete search history.

(56) References Cited

U.S. PATENT DOCUMENTS

| | | | |
|---|---|---|---|
| 4,499,055 A † | 2/1985 | Di Nicolantonio | |
| 5,950,718 A | 9/1999 | Sugitani et al. | |
| 6,419,885 B1 | 7/2002 | Di Nicolantonio et al. | |
| 7,799,963 B2 | 9/2010 | Inui et al. | |
| 8,231,837 B2 | 7/2012 | Hashimoto | |
| 2003/0127361 A1* | 7/2003 | Chae ..................... | C10G 9/20 208/130 |
| 2006/0102327 A1* | 5/2006 | Inui ....................... | C10G 9/20 165/133 |

(Continued)

FOREIGN PATENT DOCUMENTS

| | | | |
|---|---|---|---|
| JP | H9-243283 | † | 9/1997 |
| JP | H09243283 A | | 9/1997 |
| JP | 2009250450 A | | 10/2009 |

*Primary Examiner* — Randy Boyer
*Assistant Examiner* — Juan C Valencia

(57) ABSTRACT

The present disclosure relates to a heat transfer tube including an inner surface and an outer surface. The heat transfer tube further includes a first mixing element and a second mixing element disposed on the inner surface of the tube and projecting inwardly toward a central longitudinal axis of the tube. Adjacent mixing elements are separated by a gap arc distance of about 0.5 inches (1.27 cm) or greater. The first helical row has an angle (Θ) from about 15 degrees to about 85 degrees relative to the central longitudinal axis of the tube. The tube has an inner diameter of about 1.85 inches (4.7 cm) or less.

24 Claims, 3 Drawing Sheets

(56) References Cited

U.S. PATENT DOCUMENTS

2010/0143206 A1 † 6/2010 Hashimoto
2010/0191031 A1 * 7/2010 Sundaram ............ B01J 19/0026
585/656

\* cited by examiner
† cited by third party

HEAT TRANSFER TUBE FOR HYDROCARBON PROCESSING

PRIORITY

This application claims priority to and the benefit of U.S. Provisional Application No. 62/502,249, filed May 5, 2017, and is incorporated herein by reference.

FIELD

The present disclosure relates to heat transfer tubes for hydrocarbon processing including ethylene furnace radiant coils and uses thereof.

BACKGROUND

Steam-cracking is a commercial method for producing olefins such as ethylene, propylene and butadiene from a hydrocarbon feedstock. Hydrocarbon feedstocks ranging from ethane to vacuum gas-oil are used, and the reaction can be conducted in the presence of dilution steam. Ethylene, propylene, and butadiene are basic building block chemicals used in the manufacture of high volume polymeric materials and commercially important chemical intermediates. The demand for these basic building block petrochemicals is expected to continue to grow in the foreseeable future.

Steam cracking of hydrocarbons is typically performed by contacting a mixture of hydrocarbon feedstock and dilution steam with suitable coils in a cracking furnace. The mixture, typically as vapor, passes through a number of coils (made of one or more tubes). One or more of these coils pass through a convection section (convection coils) and then a radiant section (radiant coils) of the cracking furnace that provides temperatures sufficient to promote hydrocarbon cracking. Burners supply the heat necessary to bring the mixture to a desired reaction temperature and promote formation of one or more alkenes (e.g., ethylene).

A characteristic of steam cracking is the build-up of deposits of carbon-containing material (known as "coke"), e.g., on the inside of the radiant. These coke deposits interfere with heat flow through the tube walls into the stream of reactants (because the coke is an insulator), which results in higher tube metal temperatures. Eventually, the tube temperatures can reach the temperature limits of the tube metallurgy. High operating temperatures result in a decrease in radiant coil lifetime and an increase in coke accumulation rate. The coke deposits on the inside of the tubes also increase the pressure drop across the radiant coil. Higher pressures result in a decrease in the yield of desired products (primarily as a result of less selective cracking which occurs at higher pressures). Coke accumulation can be observed directly or indirectly, e.g., as indicated by a greater pressure drop across the heat transfer tube or a higher radiant tube metal temperature (at a substantially constant coil outlet temperature).

When the tube metal temperature reaches the maximum operating temperature of the material during a steam cracking process or the pressure drop through the radiant coil reaches the maximum sustainable value for a given furnace design, the process is terminated and the coils are then "decoked". At this point the formation of coke may have reached a thickness, for example, of 0.25"-0.35" (0.635 cm-0.89 cm) within the tubes. A typical decoking process results in 12-72 hours of non-productive reactor time. Decoking is typically performed by passing a mixture including air and steam through the reactor coils at high temperature. The coke is removed by a combination of combustion and erosion/spalling. Other decoking techniques which avoid the use of air may also be used where the coke is removed primarily by erosion/spalling and gasification.

Reactor selectivity to ethylene is favored by short hydrocarbon residence times within the reactor, for example, below about 0.5 seconds, and low hydrocarbon partial pressures. Radiant tubes having a decreased inner diameter (e.g., 4 inch inner diameter [about 10 cm] or less) have been investigated to increase the internal surface area-to-volume ratio of the tube for increased heat transfer from the tube to the hydrocarbon feedstock during use. The increased internal surface area-to-volume ratio provides reduced residence times (0.5 seconds or less) of hydrocarbon feedstock within the tube, which promotes selectivity of ethylene formation. High selectivity coils can also use tube inside diameters 2.25" (about 5.7 cam) or less, and residence times of 0.25 sec or less. Particular high selectivity coils in industry use tube inside diameters of 1.65" (about 4.4 cm) or less and residence times of 0.10-0.15 sec.

U.S. Pat. No. 5,950,718, incorporated by reference, describes a heat transfer tube having a continuous helical arrangement of mixing elements coupled to the inside surface of the tube. The mixing elements promote turbulence of flow through the tube and improved heat transfer coefficients. U.S. Pat. No. 7,799,963, incorporated by reference, describes a heat transfer tube having a helical mixing element geometry, but rather than a continuous helix, the mixing element includes an interrupted helix with "no bump" lanes that extend along the central longitudinal axis of the tube. U.S. Pat. No. 8,231,837, incorporated by reference, describes heat transfer tubes having a plurality of projections extending circumferentially along inner surface within a number of projection rows. Nonetheless, coke formation during the steam cracking process persists and, accordingly, the pressure drop through the radiant tube at the end of a furnace run remains an issue.

There is a need for heat transfer tubes configured to retain or improve the favorable heat transfer characteristics to promote ethylene formation without incurring the higher pressure drop.

SUMMARY

It has been discovered that coke buildup in smaller diameter tubes leads to higher than anticipated pressure drop in even heat transfer tubes, e.g., radiant tubes, having at least one passage, channel, or lane (referred to as a "no bump lane") formed by gaps located between pairs of mixing elements, the passages or channels typically being substantially parallel to the tube's central long axis (and with each other when there is more than one no bump lane). Without being bound by any theory, it is believed that coke build up occurs in the no bump lanes, and accelerates when the thickness of the coke layer approaches half the width of the no bump lane. It has been further discovered that maintaining the size of the no bump lane to greater than about 0.5 inches (about 1.27 cm) significantly lessens coked condition pressure drop for the typical run duration and typical coke thickness of a commercial furnace.

Accordingly, certain aspects of the invention relate to a heat transfer tube including an inner surface and an outer surface. The heat transfer tube further includes a first helical row comprising two or more mixing elements disposed on the inner surface of the tube and projecting inwardly toward a central longitudinal axis of the tube. Adjacent mixing elements are separated by a gap arc distance of about 0.5 inches (1.27 cm) or greater. The first helical row has an angle (Θ) from about 15 degrees to about 85 degrees relative to the central longitudinal axis of the tube. The tube has an inner diameter of about 1.85 inches (4.7 cm) or less.

Other aspects relate to a process for thermally cracking a hydrocarbon feedstock includes introducing a hydrocarbon feedstock into a heat transfer tube and cracking the hydrocarbon feedstock under thermal cracking conditions. The tube has a first helical row comprising two or more mixing elements disposed on an inner surface of the tube and projecting inwardly toward a central longitudinal axis of the tube. The tube has an inner diameter of about 1.85 inches (4.7 cm) or less. Adjacent mixing elements are separated by a gap arc distance of about 0.5 inches (1.27 cm) or greater. The first helical row has an angle (Θ) from about 15 degrees to about 85 degrees relative to the central longitudinal axis of the tube.

Still other aspects relate to depositing a coke layer on the inner surface of the tube during cracking. The coke layer disposed on the mixing elements can have a height (t) and disposed on the inner surface of the tube at a height (t') where the value of (t) is from about 70% to about 100% the value of (t').

DETAILED DESCRIPTION

Figure 1:
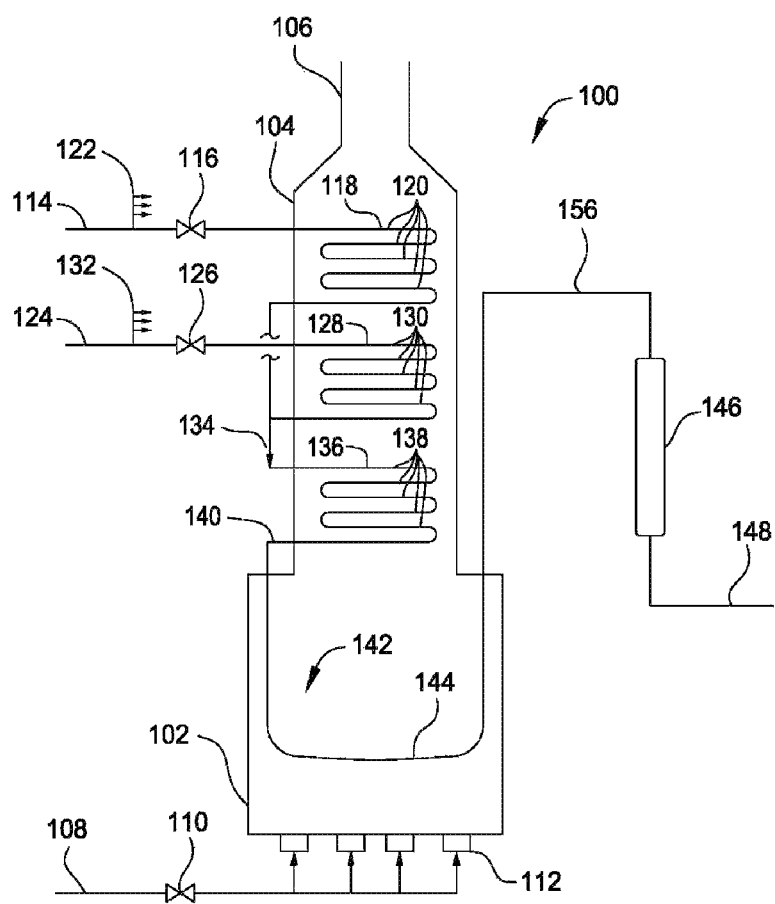
FIG. 1 schematically shows a steam cracking furnace.

The heat transfer tubes of this description and appended claims (the specified heat transfer tubes) are suitable for use as heat transfer tubes for ethylene furnace radiant coils (radiant tubes). The heat transfer tube can have, e.g., an inner diameter of about 1.85 inches (4.7 cm) or less, such as about 1.8 inches (4.57 cm) or less, and a plurality of mixing elements located proximate to an internal surface of the tube (e.g., coupled with or attached to the tube's internal surface) and arranged in an interrupted helical geometry. A gap (known as an arc distance) between the ends of two adjacent mixing elements is about 0.5 inches (1.27 cm) or greater, such as about 0.6 inches (1.52 cm) or greater. Certain forms of the specified heat transfer tube have 3 mixing elements per helical row length (one complete rotation of the helix). The specified heat transfer tubes generally provide increased heat transfer coefficients (as compared to conventional heat transfer tubes) without incurring the high pressure drop caused by coke formation in the gap between the mixing elements. In the specified heat transfer tubes, a coke layer 0.3 inches (0.76 cm) thick can be deposited in within the tube before the favorable low pressure drop across the radiant tube is eliminated. This in turn provides cracking tubes configured to promote ethylene formation and retain or improve the favorable heat transfer characteristics of the specified heat transfer tubes without incurring the higher pressure drop. Note that the pressure drop is measured across the full length of the radiant coil. These improvements provide steam cracking processes with longer duration of pyrolysis mode operation before the need arises (e.g., from excessive coking) to operate the furnace in decoking mode.

The specified tubes can be used in processes for thermally cracking a hydrocarbon feedstock, e.g., in steam cracking processes. The processes specified in this description and appended claims (specified processes) can include introducing a hydrocarbon feedstock into a heat transfer tube and cracking the hydrocarbon feedstock under thermal cracking conditions. The tube can have a first helical row comprising two or more mixing elements disposed on an inner surface of the tube and projecting inwardly toward a central longitudinal axis of the tube. The tube can have an inner diameter of about 1.85 inches (4.7 cm) or less. The specified processes can include contacting the hydrocarbon feedstock with a first mixing element of the first helical row and a second, adjacent mixing element of the first helical row. Certain of the specified processes include flowing the hydrocarbon feedstock adjacent the inner surface of the tube and through a region between the first end of the first mixing element and the first end of the second, adjacent mixing element, the region defined by an arc distance of about 0.5 inches (1.27 cm) or greater. This can include, e.g., a distribution of hydrocarbon feedstock through a heat transfer tube to selectively provide flow pathways through the tube such that coke can accumulate to a height of at least about 0.25 inches (0.635 cm), such as at least about 0.3 inches (0.76 cm), but while adequate ethylene formation parameters can be maintained. The specified processes have been found to increase the useful lifetime of the heat transfer tube, increase the duration (run-length) of thermal cracking processes, and reduce the necessity for decoking.

Steam Cracking Apparatuses and Processes

FIG. 1 is a steam cracking furnace 100 according to an embodiment of the present disclosure. As shown in FIG. 1, a steam cracking furnace 100 includes a radiant firebox 102, a convection section 104 and flue gas exhaust 106. Fuel gas is provided via conduit 108 and control valve 110 to burners 112 that provide radiant heat to a hydrocarbon feedstock disposed to produce the desired products by thermal cracking of the hydrocarbon feedstock as it flows through one or more coils. The burners generate hot flue gas that flows through the convection section 104 and then through flue gas exhaust 106.

Hydrocarbon feedstock flows via conduit 114 and valve 116 to a convection coil 118 and is preheated by indirect contact with hot flue gas flowing through convection section 104. Valve 116 is configured to regulate the amount of hydrocarbon feedstock introduced into convection coil 118. Convection coil 118 may include a plurality of heat exchange tubes 120. Feedstock 114 may also flow through a plurality of parallel feed conduits 122 and corresponding parallel convection coils (not shown). FIG. 1 illustrates 4 total feed conduits. In other embodiments, a steam cracking furnace includes 2, 3, 4, 5, 6, 7, 8, 9, 10, 11, 12, 13, 14, 15, 16, 17, 18 or more feed conduits.

Dilution steam is provided via dilution steam conduit 124 through valve 126 to convection coil 128 for preheating by indirect transfer of heat from flue gas. Valve 126 is configured to regulate the amount of dilution steam introduced into convection coil 128. Convection coil 128 may include a plurality of heat exchange tubes 130. Dilution steam 124 may also flow through a plurality of parallel dilution steam conduits 132 and corresponding parallel convection coils (not shown). The number of dilution steam conduits in plurality 132 may correspond to the number of feed conduits in plurality 122.

Preheated dilution steam and preheated hydrocarbon feed are combined in or proximate to conduit 134. The mixture of hydrocarbon feedstock and steam is reintroduced into convection section 104 via conduit 134 for preheating of the mixture in convection coil 136. Convection coil 136 may include a plurality of heat exchange tubes 138. A plurality convection coils (not shown) for mixed feedstock and steam may be provided corresponding to the number of feed conduits in plurality 122. The mixture of hydrocarbon feedstock and steam is typically preheated in convection coil 136, e.g., to a temperature from about 750° F. to about 1400° F., such as from about 1200° F. (649° C.) to about 1350° F. (732° C.).

Cross-over piping 140 is configured to provide the preheated mixture of hydrocarbon feedstock and steam to radiant coil 142 in radiant section 102 for thermal cracking of the hydrocarbon. Radiant coil 142 includes one or more heat transfer tubes 144. Heat transfer tube(s) 144 can have a plurality of mixing elements (not shown) disposed on the inner surface of the tube(s). Furnace 100 may include a plurality of radiant coils (not shown). The number of radiant coils in the plurality of radiant coils may correspond or be greater than the number of feed conduits in plurality 122. For example, the number of radiant coils fed by a single convection coil can range from 1 to as many as 40. The temperature of the heated mixture exiting convection coil 136 is generally designed to be at or near the point where significant thermal cracking commences.

A hydrocarbon feedstock can comprise of one or more relatively low molecular weight hydrocarbon (Light Feedstocks), particularly in aspects where relatively high yields of $C_2$ unsaturates (ethylene and acetylene) are desired. Light Feedstocks typically include substantially saturated hydrocarbon molecules having fewer than five carbon atoms, e.g., ethane, propane, and mixtures thereof (e.g., ethane-propane mixtures or "E/P" mix). For ethane cracking, a concentration of at least about 75 wt % of ethane is typical.

A hydrocarbon feedstock may include high molecular weight hydrocarbons ("Heavy Feedstocks"). Examples of Heavy Feedstocks include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, gas oil condensates, heavy non-virgin hydrocarbon streams from refineries, vacuum gas oils, heavy gas oil, naphtha contaminated with crude, atmospheric residue, heavy residue, $C_4$/residue admixture, naphtha/residue admixture, gas oil/residue admixture, and crude oil. The hydrocarbon feedstock can have a nominal final boiling point of about 600° F. (316° C.) or greater, such as about 750° F. (399° C.) or greater, such as about 850° F. (455° C.) or greater, for example about 950° F. (510° C.). Nominal final boiling point means the temperature at which 99.5 wt % of a particular sample has reached its boiling point.

The preheated mixture of hydrocarbon feedstock and steam is provided via cross-over piping 140 to radiant coil 142 disposed in the furnace's radiant section 102. A flow rate of preheated mixture of hydrocarbon feedstock and steam through a radiant coil, such as radiant coil 142, can be from about 250 feet per second (about 76 meters per second) to about 600 feet per second (183 meters per second), such as from about 400 feet per second (122 meters per second) to about 500 feet per second (152 meters per second). Note that these values correspond to gas velocities in the radiant coil when no coke is present. Higher velocities are generated as coke thickness increases. A radiant coil, such as radiant coil 142, can have a length from about 30 feet (about 9.1 meters) to about 300 feet (about 91 meters), such as from about 35 feet (about 11 meters) to about 200 feet (about 61 meters). In some embodiments, a radiant coil, such as radiant coil 142 can have a length from about 35 feet (about 11 meters) to about 45 feet (about 14 meters).

In certain aspects, the mixture of hydrocarbon feedstock and steam comprises steam in an amount from about 10 wt % to about 90 wt %, based on the weight of the mixture, with the remainder of the mixture including the hydrocarbon feedstock. In at least one embodiment, the mixture of hydrocarbon feedstock and steam is produced by combining the preheated hydrocarbon exiting convection coil 118 with the preheated steam exiting convection coil 128, e.g., at a ratio of about 0.1 to about 1 kg steam per kg hydrocarbon, such as a ratio of about 0.2 to about 0.6 kg steam per kg hydrocarbon.

Steam cracking conditions can include exposing the mixture of hydrocarbon feedstock and steam to a temperature (measured at the radiant outlet) of greater than or equal to 400° C., such as from about 400° C. to about 900° C., and a pressure greater than or equal to about 0.1 bar, for a cracking residence time of from about 0.01 seconds to about 5 seconds, such as from about 0.1 seconds to about 0.5 seconds.

In at least one embodiment, the hydrocarbon feedstock includes Heavy Feedstock, and the mixture of hydrocarbon feedstock and steam includes about 0.2 to about 1 kg steam per kg hydrocarbon. Steam cracking conditions can include one or more of (i) a temperature of the mixture from about 760° C. to about 880° C.; (ii) a pressure within the radiant coil from about 1 to about 5 bar, or (iii) a cracking residence time from about 0.10 to about 2 seconds. The effluent of a radiant coil can have a temperature from about 760° C. to about 880° C., e.g., about 790° C.

In at least one embodiment, the hydrocarbon feedstock includes Light Feedstock, and the mixture includes from about 0.2 to about 0.5 kg steam per kg hydrocarbon. The steam cracking conditions can include one or more of (i) a temperature of the mixture from about 760° C. to about 1100° C.; (ii) a pressure within the radiant coil from about 1 to about 5 bar, or (iii) a cracking residence time from about 0.10 to about 2 seconds. The effluent of a radiant coil can have a temperature from about 760° C. to about 1100° C., such as about 900° C. for ethane or propane feeds.

After the desired degree of thermal cracking has been achieved in radiant section 102, the radiant coil effluent 156 is rapidly cooled. For example, radiant coil effluent 156 is provided to one or more quenching stage 146. Quenching methods are well known and quenching stage 146 may be any known quenching method such as a transfer line exchanger (TLE) where radiant coil effluent 156 is cooled indirectly or a quench fitting through which quench oil (not shown) is injected directly into the radiant coil effluent 156. A plurality of quenching stages (not shown) can be utilized in parallel with stage 146 corresponding to the number of feed conduits in plurality 122.

Sufficient cooling is provided in quenching stages 146 to ensure the temperature of the quenched radiant coil effluent 148 is suitable for feeding to downstream separation equipment. For example, a primary fractionator (not shown) can receive quenched radiant coil effluent having a temperature from about 288° C. (550° F.) to about 315° C. (600° F.).

Heat Transfer Tubes

Figure 2:
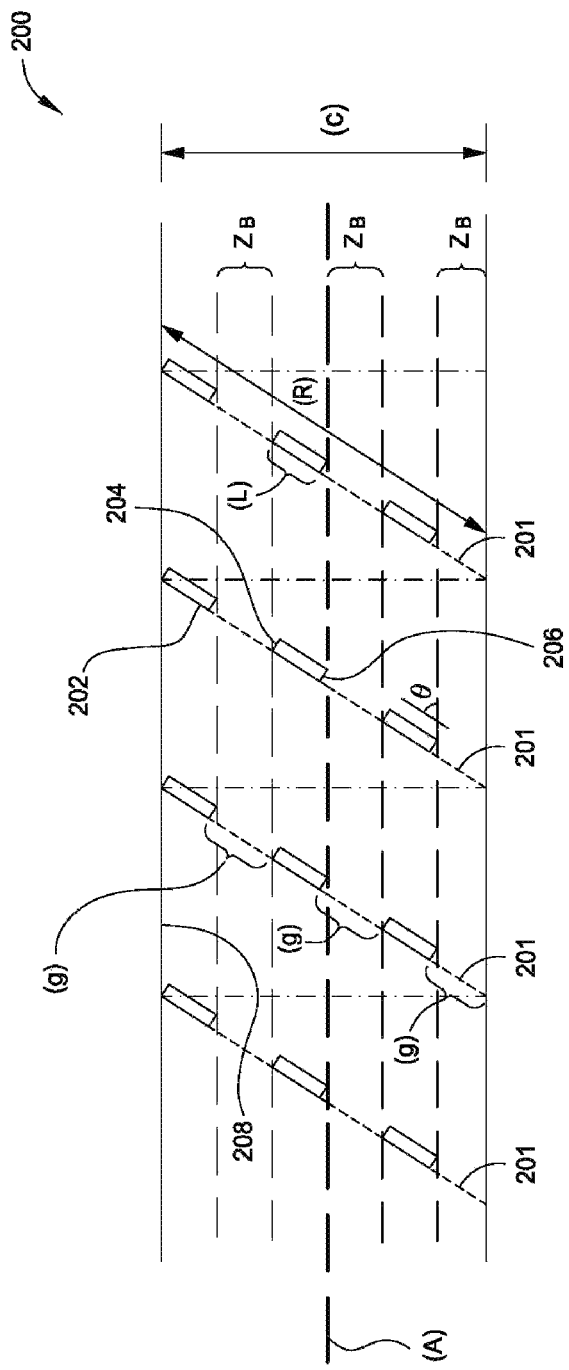
FIG. 2 is a sectional view of a heat transfer tube along a cross-section parallel to the central longitudinal axis of the tube.

FIG. 2 is a sectional view of the inner surface of one form of the specified heat transfer tube, and is suitable for use as heat transfer tube 144. The sectional view is along a cross-section parallel to the tube's central longitudinal axis. Heat transfer tube 200 has an inner circumference (c) which is related to inner diameter (d) (not shown in FIG. 2) by Equation 1 below, when the cross section is substantially circular.

$$c = \pi d \qquad \text{Equation (1)}$$

Heat transfer tube 200 includes a helical row 201, disposed on inner surface 208 at an angle (Θ) relative to a central longitudinal axis (A) of heat transfer tube 200. Angle (Θ) is typically in the range of from about 15 degrees to about 85 degrees. Row length (R) of helical row 201 represents the length of a section of helical row 201 traversing a 360 degree turn (a complete turn) about the central longitudinal axis (A) of heat transfer tube 200. Row length (R) is related angle and inner diameter (d) (not shown) and is given by Equation 2 below, for tubes having a substantially circular cross section.

$$R = \pi d / \sin \Theta \qquad \text{Equation (2)}$$

For clarity, the bottom of any row length (R) in FIG. 2 is connected to the top of adjacent row length such that the helical row 201 continues to form a helix (or spiral) along the inner surface 208 rotating about central longitudinal axis (A).

Helical row 201 has two or more mixing elements 202 disposed on inner surface 208 and projecting inwardly toward central longitudinal axis (A). Each mixing element 202 has a first end 204 and second end 206. The first end 204 of a first mixing element is separated from a second end 206 of a second adjacent mixing element by a gap arc distance (g), forming an interrupted helical geometry of individual mixing elements 202 along helical row 201. The gap arc distance (g) is measured along inner surface 208 from where the first end 204 of the first element meets the inner surface to where the second end 206 of the second adjacent element meets the inner surface. The gap arc distance (g) is measured in the direction of the helical row 201.

Each mixing element 202 has an element arc length (L) representing the arc length of the mixing element measured along inner surface 208 from where the first end 204 of the element meets the inner surface to where the second end 206 of the same element meets the inner surface. The element arc length (L) is measured in the direction of the helical row 201.

In one embodiment, the mixing elements 202 in a given row may have different element arc lengths (L) and/or gap arc distances (g).

Preferably, element arc lengths (L) of individual mixing elements 202 are equal and the gap arc distances (g) between mixing elements are also equal. For preferred tubes of substantially circular cross section, the number (n) of individual mixing elements 202 in one complete turn of helical row 201 is related to the gap arc distance (g), row length (R), element arc length (L), and angle (Θ) by the following Equations 3-5.

$$g = \frac{R - n(L)}{n} \qquad \text{Equation (3)}$$

$$g = \frac{(\pi d / \sin \Theta) - n(L)}{n} \qquad \text{Equation (4)}$$

$$g = \frac{(\pi d)}{n(\sin \Theta)} - L \qquad \text{Equation (5)}$$

As can be appreciated the number of mixing elements (n) in one turn of helical row 201 can vary. In a preferred embodiment, the number of mixing elements (n) is three (3).

A "no bump lane" is a region parallel to a central longitudinal axis of a heat transfer tube of the present disclosure where the gap arc distances of the mixing elements of the helical rows align to promote flow of hydrocarbon feedstock through the tube with reduced "bumping" of the feedstock into mixing elements as the feedstock flows through the tube. Said another way, the feedstock flows along the no bump lane unimpeded by any mixing element. For example, the gap arc distances (g) can be aligned along central longitudinal axis (A) to form a region ($Z_B$), which is a "no bump lane", namely a passage where no mixing elements are present along a channel of passage proximate to the tube's internal surface, the passage or channel extend for substantially the entire longitudinal length of the tube. For example, region ($Z_B$) does not have any mixing element 202 along central longitudinal axis (A) of the heat transfer tube, which provides a lane for hydrocarbon feedstock and/or steam to flow unimpeded adjacent to surface 208 of tube 200.

Mixing elements, such as mixing elements 202, may be adhered or otherwise affixed to an inner surface, such as inner surface 208, of a tube by any known method including welding. U.S. Pat. No. 7,799,963, incorporated by reference, describes suitable methods such as plasma powder welding (PPA welding). For PPA welding, a tube is horizontally supported by a rotary drive apparatus that is rotatable about its axis. A welding torch is coupled with a support arm that is inserted into the tube and is held parallel to the longitudinal tube axis (A) (see e.g., FIG. 8 of U.S. Pat. No. 7,799,963). A powder material is supplied by a pipe to the welding torch, which forms beads on the inner surface of the tube. The tube is rotated and moved along the longitudinal tube axis (A) as the welding torch intermittently forms helical mixing elements having beads formed by overlaying. The speed of rotation of the tube, the number of welding torches, the speed of horizontal movement, etc., can be adjusted to form the different mixing element configurations of the present disclosure. PPA welding methods that rotate the welding torch support arm inside a stationary tube are also contemplated in the invention.

Figure 3:
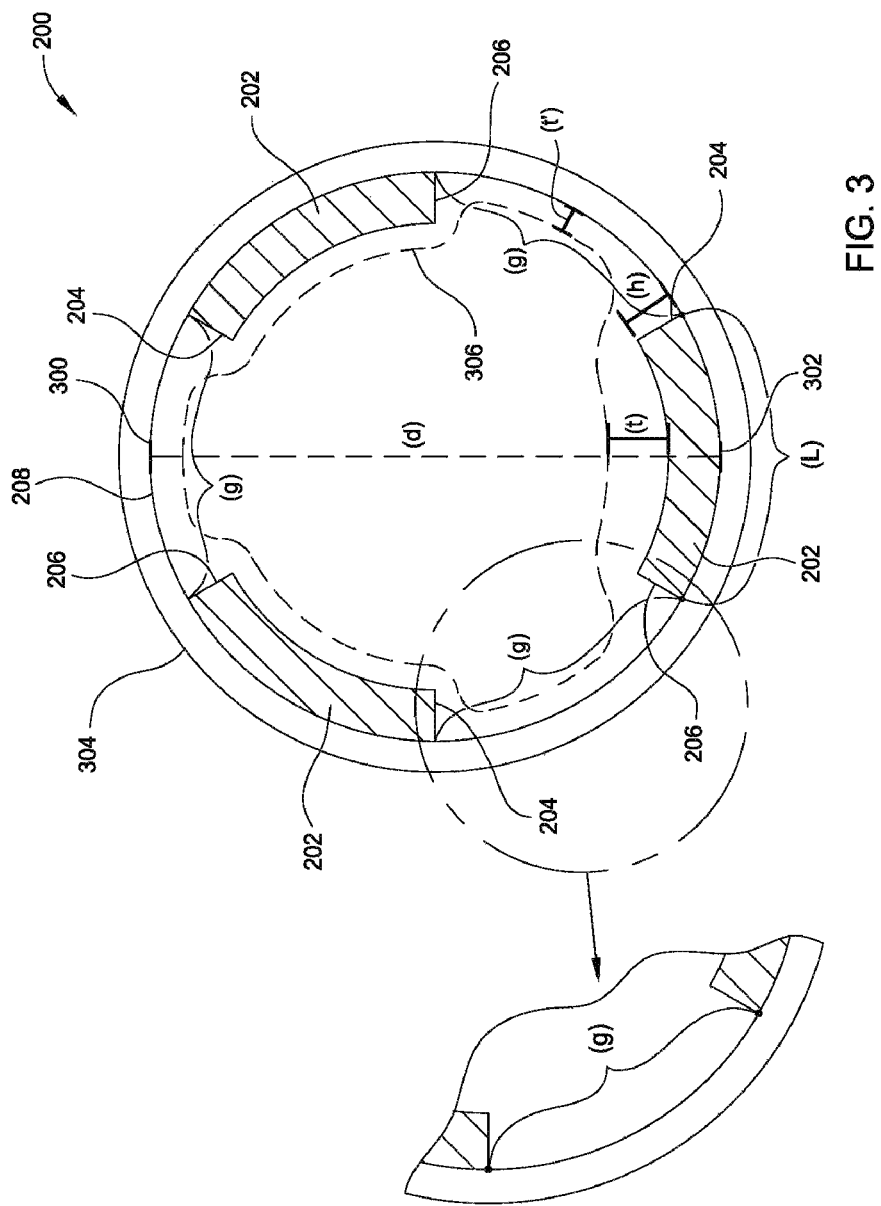
FIG. 3 is a sectional view of a heat transfer tube along a cross-section orthogonal to the central longitudinal axis of the tube.

FIG. 3 is a sectional view of a form of the specified heat transfer tube having a, substantially circular cross section. This form of tube can similar to (or the same as) the heat transfer of FIG. 2, with like features identified by like index numbers, but viewed in a cross-section orthogonal to the central longitudinal axis of the tube. As shown in FIG. 3, heat transfer tube 200 has an inner surface 208 and an outer surface 304 opposite the inner surface 208. Heat transfer tube 200 also has an inner diameter (d) defined by a distance between a first side 300 of inner surface 208 and a second side 302 of inner surface 208 opposite the first side 300 along a straight line passing through the tube's central axis. Mixing elements 202 have a height (h). Height (h) of mixing elements 202 can be, e.g., in the range of from about 1 mm to about 10 mm, such as from about 1 mm to about 5 mm, and can be selected independently from the height of other mixing elements.

The first end 204 of a first mixing element is separated from a second end 206 of a second (adjacent) mixing element by gap arc distance (g). Gap arc distance (g) is measured along inner surface 208 between where a first end 204 of a first mixing element meets inner surface 208 and where a second end 206 of a second (adjacent) mixing element meets inner surface 208. The gap arc distance (g) is measured in the direction of the helical row (not shown in FIG. 3).

Mixing element 202 has an element arc length (L) representing the arc length of the mixing element measured along inner surface 208 from where the first end 204 of the element meets the inner surface to where the second end 206 of the same element meets the inner surface. The element arc length (L) is measured in the direction of the helical row (not shown in FIG. 3).

Inner diameter (d) is typically about 1.85 inches (4.7 cm) or less, such as about 1.8 inches (4.57 cm) or less, such as from about 1 inch (2.54 cm) to about 1.8 inches (4.57 cm), for example about 1.62 inches (4.11 cm) or 1.82 inches (4.62), and gap arc distance (g) is about 0.5 inches (1.27 cm) or greater, such as about 0.6 inches or greater, such as from about 0.5 inches (1.27 cm) to about 1.5 inches (3.8 cm), for example about 0.63 inches (1.6 cm).

Referring again to FIG. 3, a coke layer 306 may become deposited on inner surface 208 at a height (t') and also deposited on mixing elements 202 at a height (t). In at least one embodiment, the height (t) is measured normal to the mixing element surface at the midpoint of the mixing element and normal to the inner surface of the tube. Similarly, height (t') is measured normal to the tube surface at the midpoint in the gap between an two adjacent mixing elements. When the gap arc distance (g) is set according to the present disclosure, the height (t) can be at least about 70%, such as 85%, 90%, or 95% of height (t') measured normal to the tube surface at the midpoint in the gap between an two adjacent mixing elements.

It has been discovered that a heat transfer tube having an inner diameter (d) of about 1.85 inches (4.7 cm) or less, such as about 1.8 inches (4.57 cm) or less in addition to a gap arc distance (g) of about 0.5 inches (1.27 cm) or greater provides retained heat transfer coefficients (as compared to heat transfer tubes having gaps between mixing elements) without incurring the high pressure drop caused by coke formation in the gap between the mixing elements.

It has also been discovered that deposition of a coke layer 0.3 inches (0.76 cm) thick (e.g., t and/or t' values are 0.3 inches or greater) can occur within the tube before the favorable low pressure drop at the end of the tube is eliminated, which provides steam cracking processes with longer run-length (also known as 'run time') without having to terminate the steam cracking process to perform a decoking process. Without being bound by theory, these inner diameter and arc distance dimensions allow, for example, a "no bump lane" to be present along the central longitudinal axis (A) of the tube despite the formation of a coke layer that is, for example, 0.25 inches (0.635 cm) thick or greater, such as 0.3 inches (0.76 cm) thick.

The scope of the present disclosure is not limited to gaps arc distances (g) of only 0.6 inches and coke layers of 0.3 inches thick. These are typical coke thicknesses for typical commercial duration (run-length) for pyrolysis mode operation run-length (e.g., the duration of steam cracking mode before decoking mode operation becomes necessary). If the desired run-length between decokes results in a coke layer that is thicker than 0.3 inches, the gap arc distance (g) should be increased a corresponding amount to account for the new coke layer thickness and retain the desired "no bump lane" pressure drop performance.

Comparative Example 1

As a comparative example, a heat transfer tube having an inner diameter (d) of 2.25 inches (5.71 cm), four mixing elements, a gap arc distance (g) of greater than 0.5 inches (1.27 cm) between mixing elements, and a length of approximately 70 feet (about 21.3 m) was used in a steam cracking process under steam cracking conditions. A predicted pressure drop was calculated for the tube with a coke layer greater than about of about 0.2 inches (0.5 cm) thick but that still retained the shape and gap distance between mixing elements. After twenty six days of cracking under steam cracking conditions, the actual pressure drop measured across tube inlet and exit was as predicted. The tube metal temperatures were also as predicted under steam cracking conditions. Heat transfer and selectivity were as predicted for a tube of this diameter, length and residence time.

Comparative Example 2

As a second comparative example, a heat transfer tube having an inner diameter (d) of 1.62 inches (4.11 cm), four mixing elements, and a gap arc distance (g) of less than 0.5 inches (1.27 cm) was used for a steam cracking process under steam cracking conditions. A predicted pressure drop was calculated for the tube with a coke layer greater than about of about 0.2 inches (0.5 cm) thick but that still retained the shape and gap distance between mixing elements. Surprisingly, after only twenty two (22) days of cracking under steam cracking conditions, the actual pressure drop measured across tube inlet and exit was 13 psi (34%) higher than predicted. The tube metal temperature and pressure drop were the same as those predicted for a similar diameter heat transfer tube having a continuous (uninterrupted) mixing element (i.e., without gap arc distances between mixing elements or where a "no bump lane" is not present).

Heat transfer tubes which further comprise a second, third, fourth, etc. helical row containing two or more mixing elements disposed on the inner surface of the tube are within the scope of the invention. The angle at which each row is disposed with respect to the tube's central axis can be the same as that of at least one other row, but this is not required. For example, a second helical row can be disposed at same angle ($\Theta$) as a first helical row relative to the central longitudinal axis of the tube, or the second helical row can be disposed at a second angle ($\Theta_{II}$) that is different from angle ($\Theta$) of the first helical row. Second angle ($\Theta_{II}$) is typically in the range of from about 15 degrees to about 85 degrees relative to the central longitudinal axis of the heat transfer tube. The longitudinal distance between a first helical row and second helical row can be from about 20 millimeters (mm) to about 400 mm. The mixing elements of the first helical row can have a first element arc length ($L_1$) and the second helical row can have a second element arc length ($L_2$). Arc lengths ($L_1$) and ($L_2$) can be substantially the same or different. In certain aspects having one or more additional helical rows of mixing elements, the mixing elements of a row do not interfere substantially with the no bump lane of another row.

Decoking

Decoking mode can be carried out after a coke layer of undesirable thickness forms within the specified heat transfer tube, e.g., as evidenced by an undesirably large pressure drop across the tube's internal volume. Decoking may be performed at any coke layer thickness. For example, decoking is performed when a coke layer has a (t) value and/or (t') value of about 0.2 inches (0.5 cm) or greater, such as about 0.25 inches (0.635 cm) or greater, such as about 0.3 inches (0.762 cm) or greater.

Conventional decoking technology can be used but the invention is not limited thereto. For example, steam-air decoking can be used, as can decoking with steam only. Online decoking can be used, as can offline decoking. Steam-air decoking of the specified heat transfer tubes will now be described in more detail, but the invention is not limited thereto.

Steam-air decoking can be performed by flowing a steam-air mixture through coils designated for decoking, while continuing operation of the burners (albeit at reduced caloric output). All of the coils in a furnace can be decoked during a decoking interval (e.g., all are decoked during the same time interval). After sufficient decoking, the decoked furnace coils are switched from the decoking process to a second steam cracking process. Decoking can be repeated when an undesirable amount of coke again accumulates in the furnace's coils.

Decoking can include (i) substituting a flow of air for the flow of hydrocarbon feedstock to the convection coils, (ii) continuing a flow of steam to the convection coils and combining the air with the steam to produce a preheated air-steam mixture, (iii) passing the pre-heated air/steam decoking mixture through the cross-over piping from the convection coils to the radiant coils, and conducting decoking effluent away from the radiant coils.

Referring again to FIG. 1, a decoking mode can be carried out in which convection coil 136, cross-over piping 140, and radiant coil 142 are all undergoing decoking during decoking mode operation. Decoking includes substituting air or other convenient oxidant for the hydrocarbon feedstock in conduit 114. The amount of air utilized for decoking can be regulated with valve 116. A flow of steam is maintained in conduit 124. The amount of steam utilized for decoking can be regulated using valve 126. Preheated air and preheated steam are combined in or proximate to conduit 134 to produce a decoking mixture. Decoking is performed in convection coil 136, cross-over piping 140, and radiant coil 142 to produce a decoking effluent, which is transferred via transfer line piping 156 to quenching stage 146. Decoking removes at least a portion of the coke deposits in convection coil 136, cross-over piping 140, and radiant coil 142, primarily by controlled combustion of accumulated coke. A decoking process is continued for a decoking time interval until the amount of accumulated coke in the conduits undergoing decoking is at or less than a desired amount. The amount of accumulated coke remaining during decoking can be monitored directly or indirectly, e.g., as indicated by a lesser pressure drop across the radiant coil or a lower concentration of $CO_2$ in the decoke effluent stream. After sufficient coke is removed, the decoked conduits can be switched from decoking mode to steam cracking mode.

The specified heat transfer tubes when used in a steam cracking furnace, and in particular in the radiant section of the steam cracking furnace, typically have an inner diameter (d) of about 1.85 inches (4.7 cm) or less, such as about 1.8 inches (4.57 cm) or less, in addition to an arc distance (g) of about 0.5 inches (1.27 cm) or greater, such as about 0.6 inches (1.52 cm) or greater. The specified heat transfer tubes (i) beneficially retain a greater heat transfer coefficient value during the course of pyrolysis mode in comparison with conventional heat transfer tubes, including those having gaps between mixing elements, and (ii) the pressure drop resulting from coke formation in the gap between the mixing elements is less than that exhibited by conventional heat transfer tubes. Deposition of a coke layer 0.3 inches (0.76 cm) thick (e.g., t and/or t' values are 0.3 inches (0.76 cm) or greater) can occur within the specified heat transfer tubes before the favorable low pressure drop at the end of the tube is substantially lessened or eliminated. The favorable heat transfer characteristics of heat transfer tubes are retained or even improved without exhibiting a greater pressure drop, and favorably increase ethylene yield. These improvements provide steam cracking processes with longer run-length with less need to interrupt steam cracking mode to operate in decoking mode.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising", it is understood that it is also contemplated that the same composition or group of elements with transitional phrases "consisting essentially of," "consisting of", "selected from the group of consisting of," or "is" preceding the recitation of the composition, element, or elements and vice versa.

What is claimed is:

1. A heat transfer tube comprising:
   an inner surface and an outer surface; and
   a first helical row comprising a plurality of mixing elements disposed on the inner surface of the tube and projecting inwardly toward a central longitudinal axis of the tube; wherein:
   adjacent mixing elements are separated by a gap arc distance of about 1.52 cm or greater;
   the first helical row has an angle ($\Theta$) from about 15 degrees to about 85 degrees relative to the central longitudinal axis of the tube;
   the tube has an inner diameter of about 4.7 cm or less;
   the number of mixing elements along one complete turn of the first helical row is three; and
   a region ($Z_B$) on the inner surface where no mixing elements are present extends an entire longitudinal length of the tube.

2. The tube of claim 1, further comprising a coke layer disposed on the mixing elements at a height (t) and disposed on the inner surface of the tube at a height (t'), wherein the value of (t) is from about 70% to about 100% of the value of (t').

3. The tube of claim 1, further comprising a second helical row comprising two or more mixing elements disposed on the inner surface of the tube and projecting inwardly toward a central longitudinal axis of the tube, the second helical row disposed at an angle ($\Theta_{II}$) relative to the central longitudinal axis of the tube, ($\Theta_{II}$) is from about 15 degrees to about 85 degrees, and the value of ($\Theta$) is different than the value of ($\Theta_{II}$).

4. The tube of claim 3, wherein the mixing elements of the first helical row have an element arc length different than an element arc length of the mixing elements of the second helical row.

5. The tube of claim 3, wherein a longitudinal distance between the first helical row and the second helical row is from about 20 millimeters to about 400 millimeters.

6. The tube of claim 1, wherein the height of the mixing elements is independently from about 1 millimeter to about 5 millimeters.

7. The tube of claim 1, wherein the tube is included in a steam cracking furnace.

8. The tube of claim 1, wherein the number of regions ($Z_B$) on the inner surface where no mixing elements are present that extend an entire longitudinal length of the tube is three.

9. A process for thermally cracking a hydrocarbon feedstock, comprising:
introducing a hydrocarbon feedstock into a heat transfer tube and cracking the hydrocarbon feedstock under thermal cracking conditions, the tube comprising a helical row comprising a plurality of mixing elements disposed on an inner surface of the tube and projecting inwardly toward a central longitudinal axis of the tube; wherein:
the tube has an inner diameter of about 4.7 cm or less;
adjacent mixing elements are separated by a gap arc distance of about 1.52 cm or greater;
the helical row has an angle ($\Theta$) from about 15 degrees to about 85 degrees relative to the central longitudinal axis of the tube;
the number of mixing elements along one complete turn of the helical row is three; and
a region ($Z_B$) on the inner surface where no mixing elements are present extends an entire longitudinal length of the tube.

10. The process of claim 9, wherein a coke layer is deposited on the inner surface of the tube during cracking.

11. The process of claim 10, wherein the coke layer is disposed on at least one of the mixing elements at a height (t) and disposed on the inner surface of the tube at a height (t'), wherein the value of (t) is from about 70% to about 100% of the value of (t').

12. The process of claim 11, wherein the value of (t) is 0.635 cm or greater.

13. The process of claim 9, further comprising introducing steam into the heat transfer tube under thermal cracking conditions.

14. The process of claim 9, further comprising preheating the hydrocarbon feedstock to a temperature from about 649° C. to about 760° C.

15. The process of claim 9, wherein introducing the hydrocarbon feedstock into the heat transfer tube is performed at a rate from about 76.2 meters per second to about 152 meters per second, and wherein the velocity is measured at the outlet of the radiant tube with no coke present.

16. The process of claim 9, wherein a residence time of the hydrocarbon feedstock within the heat transfer tube is from about 0.1 seconds to about 0.5 seconds.

17. The process of claim 9, wherein the thermal cracking conditions include heating the hydrocarbon feedstock to a temperature from about 760° C. to about 1100° C.

18. The process of claim 11, further comprising decoking the tube when the value of (t) is about 0.635 cm or greater.

19. The process of claim 9, further comprising decoking the tube using steam.

20. The process of claim 9, further comprising decoking the tube using air.

21. The process of claim 9, wherein the number of regions ($Z_B$) on the inner surface where no mixing elements are present that extend an entire longitudinal length of the tube is three.

22. A process for thermally cracking a hydrocarbon feedstock, comprising:
introducing a hydrocarbon feedstock into a heat transfer tube and cracking the hydrocarbon feedstock under thermal cracking conditions, the tube comprising a helical row comprising two or more mixing elements disposed on an inner surface of the tube and projecting inwardly toward a central longitudinal axis of the tube; wherein:
the tube has an inner diameter of about 4.7 cm or less;
adjacent mixing elements are separated by a gap arc distance of about 1.52 cm or greater;
the helical row has an angle ($\Theta$) from about 15 degrees to about 85 degrees relative to the central longitudinal axis of the tube;
a coke layer is deposited on the inner surface of the tube during cracking;
the coke layer is disposed on at least one of the mixing elements at a height (t) and disposed on the inner surface of the tube at a height (t'), wherein the value of (t) is from about 70% to about 100% of the value of (t');
(t) is about 0.635 cm or greater and a pressure drop during thermal cracking along the tube is less than a pressure drop of a similar comparative tube having a coke layer deposited on the inner surface thereof,
the similar comparative tube contains a comparative coke layer having a height of about 0.635 cm or greater, and
adjacent mixing elements of the comparative tube are separated by an arc distance of less than about 1.52.

23. The process of claim 22, wherein the number of mixing elements along one complete turn of the helical row is three, and wherein a region ($Z_B$) on the inner surface where no mixing elements are present extends an entire longitudinal length of the tube.

24. The process of claim 23, wherein the number of regions ($Z_B$) on the inner surface where no mixing elements are present that extend an entire longitudinal length of the tube is three.

* * * * *